United States Patent [19]

MacLeod

[11] 4,207,568

[45] Jun. 10, 1980

[54] UNDERWATER COMMUNICATIONS SYSTEM

[75] Inventor: Norman C. MacLeod, Sunnyvale, Calif.

[73] Assignee: Technology Development Corporation, Santa Clara, Calif.

[21] Appl. No.: 919,248

[22] Filed: Jun. 26, 1978

[51] Int. Cl.² ............................................. H04B 13/02
[52] U.S. Cl. ....................................... 340/852; 455/40
[58] Field of Search ............ 340/4 E, 18 CM; 325/28, 325/130; 343/719

[56] References Cited

U.S. PATENT DOCUMENTS 3,668,617  6/1972  Brainard ............................ 340/4 E Primary Examiner—Richard A. Farley
Attorney, Agent, or Firm—Claude A. S. Hamrick

[57] ABSTRACT

An improved method and apparatus for underwater communication, the apparatus comprising two dipoles disposed in a common body of water, both dipoles including a pair of separated electrodes, a transmitter connected to one dipole, a receiver connected to the other dipole and a nonconducting hose or tube extending between one of the electrodes of a first dipole and one of the electrodes of the second dipole.

17 Claims, 6 Drawing Figures

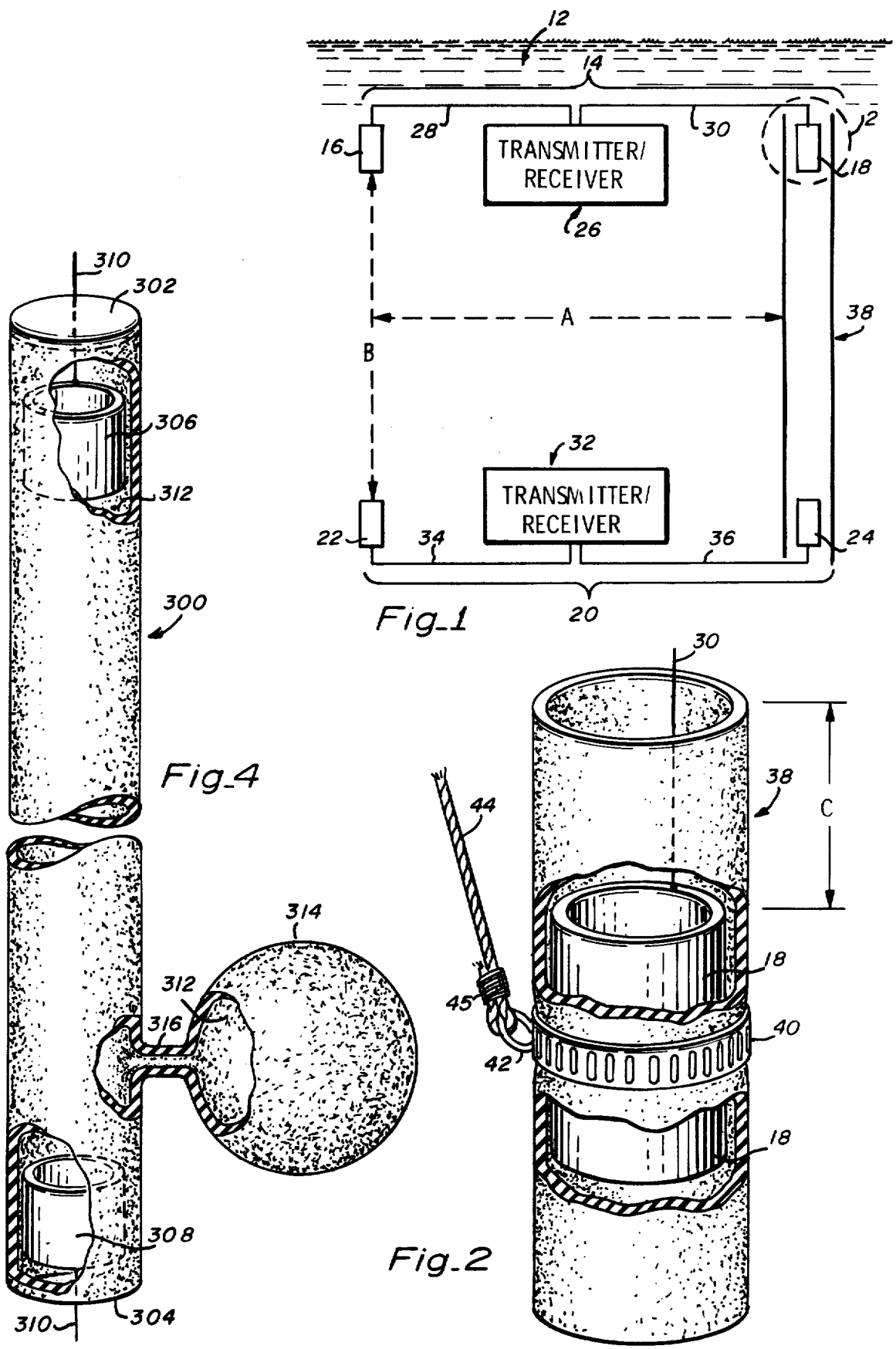

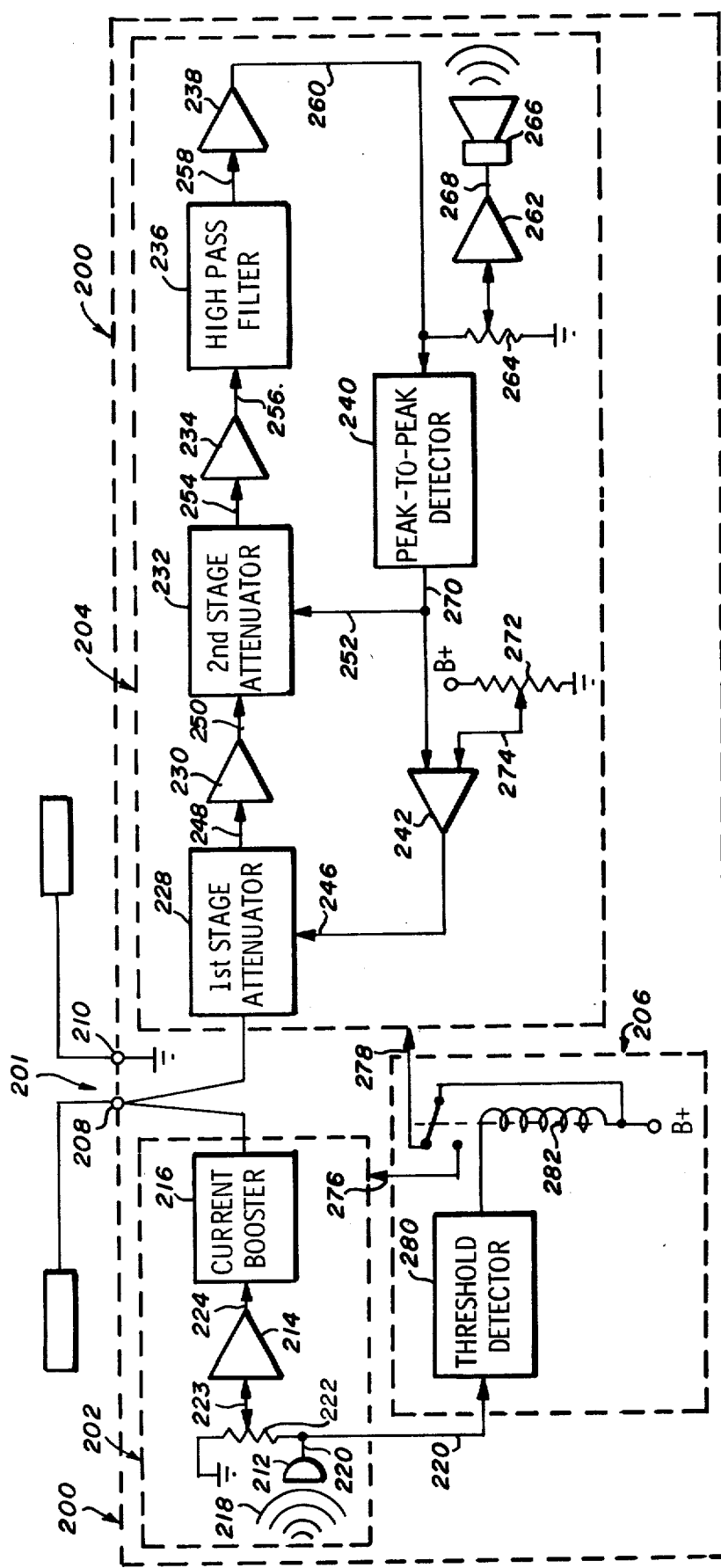
Fig_3

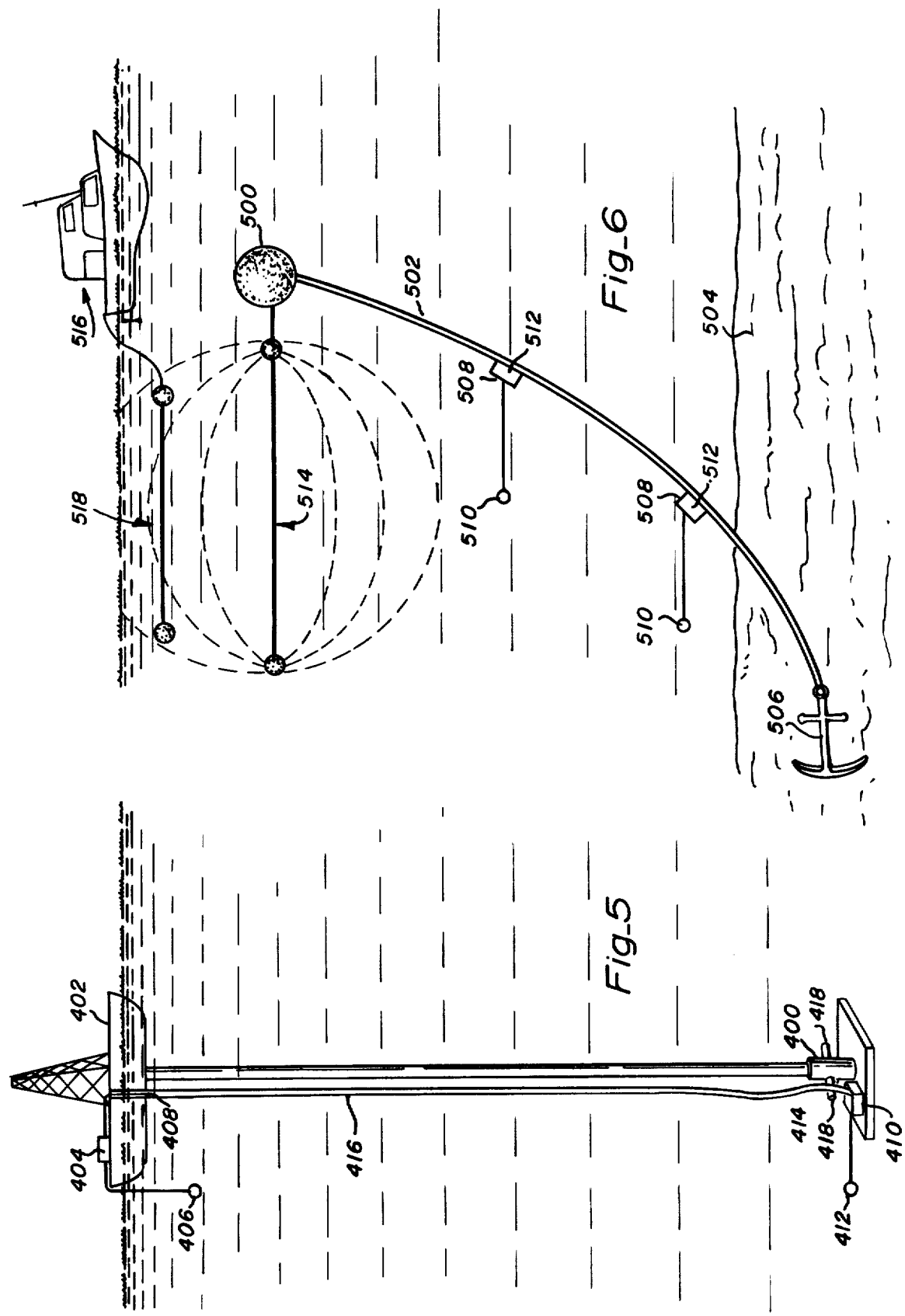

UNDERWATER COMMUNICATIONS SYSTEM

BACKGROUND OF THE INVENTION

1. Field of the Invention

This invention relates generally to communication systems and more specifically to wireless underwater communication systems utilizing the water as a conductor for the propagation of electromagnetic energy.

2. Description of the Prior Art

Until now, underwater communication and data transmission systems have been one of three major types.

The first type of communication system includes a metal wire electrical connector extending between a transmission unit and a reception unit. A problem with this "hard wired" system is that the rigors of underwater environments are such that the electrical connector will frequently break, especially when extended to great depths or over long distances.

Accoustic transmission such as "sonar" is also used for underwater communication for distances up to about 1,000 feet. A problem with accoustic transmission is that the intelligibility of the transmissions is often low due to the ambient noises, reverberations and thermocline echoes generated by underwater environments.

The third type of system utilizes the body of water as a conductor for electric field transmission. This system is an improvement over hard wired and accoustic transmission systems because it is relatively immune to the stresses and noises of underwater environment. However, a problem with the electric field transmission systems found in the prior art is that their transmission ranges are limited by the substantial electromagnetic radiation attenuation of natural bodies of water.

SUMMARY OF THE PRESENT INVENTION

It is therefore a major object of this invention to provide an underwater electric field transmission communication system with a range far greater than those found in prior art systems.

The apparatus of the present invention includes two separated dipoles disposed in a common body of water, where each of the dipoles includes a separated pair of electrodes, a transmission device connected to one dipole and a reception device connected to the other dipole, and an elongated, insulating tube surrounding a liquid conducting medium and connecting an electrode of a first dipole to an electrode of the second dipole.

The method includes, briefly, the steps of disposing a pair of dipoles in a common body of water, each dipole including two separated electrodes, connecting one of the dipoles to a transmitter and connecting the other dipole to a receiver, and extending a nonconducting hose or tube between an electrode of one of the dipoles and an electrode of the other dipole.

An advantage of the present invention is that the range of the underwater electric field transmission is greatly increased by the wave guiding action of the tube.

Another advantage of my invention is that the tube is able to withstand the stresses of underwater environments far better than solid metal wire conductors could.

These and other objects and advantages of the present invention will no doubt become apparent to those skilled in the art after having read the following detailed description of the preferred embodiment which is illustrated in the several figures of the drawing.

IN THE DRAWING

FIG. 1 is a schematic and block diagram view of an improved underwater communications system in accordance with my present invention;

FIG. 2 is an enlarged perspective detail of the encircled portion of the underwater communications system shown in FIG. 1;

FIG. 3 is a schematic and block circuit diagram of a preferred embodiment for the transmitter/receiver shown in FIG. 1;

FIG. 4 is a partially broken side elevational view of an alternate embodiment for an improved underwater communications system in accordance with the present invention;

FIG. 5 illustrates an application for the improved underwater communications system of the present invention; and FIG. 6 illustrates another application for the improved underwater communications system of the present invention.

DETAILED DESCRIPTION OF THE PREFERRED EMBODIMENT

Referring to FIG. 1, an improved underwater communications system 10 is shown submerged in a body of water 12 and includes a first dipole 14 having a pair of electrodes 16 and 18, and a second dipole 20 having a pair of electrodes 22 and 24. A transmitter/receiver device 26 is connected to electrodes 16 and 18 of dipole 14 by insulating wires 28 and 30, respectively. Similarly, transmitter/receiver 32 is connected to electrodes 22 and 24 of dipole 20 by insulating wires 34 and 36, respectively.

A tube 38 extends between electrode 18 of the first dipole and electrode 24 of the second dipole. It is to be understood, however, that the tube could extend between either one of the first dipole's electrodes and either of the second dipole's electrodes without adversely affecting the performance of the system.

The wall thickness of the tube is usually substantially less than its internal diameter so that a large volume of water may flood freely throughout it. The tube must be constructed from a nonconducting material, such as plastic, for reasons that will be explained later.

Referring now to FIG. 2, which is an enlarged perspective view of the encircled portion of FIG. 1, the fastening of electrode 18 to the tube may be seen. The connection between electrode 24 and the other end of the tube is substantially the same and will not be discussed separately. The electrodes are preferably thin-walled, hollow cylinders and should be made from a strong, noncorrosive and long-wearing conductive material such as stainless steel. The outer diameter of the electrodes is chosen to be approximately the same as the internal diameter of tube 38. This hollow, cylindrical design for the electrodes allows for substantially unrestricted fluid flow through the tube.

Disposed around the tube 38 and electrode 18 is a clamp 40, which is very similar in design to the hose-type clamps used to secure the water hoses in an automobile. Of course, clamp 40 should be more ruggedly constructed than an automotive hose clamp and should be made of stainless steel, or galvanized or otherwise protected against corrosive agents found in the water. Clamp 40 pinches the portion of the tube it surrounds and causes that portion to be firmly constricted about the electrode, holding it in place in the tube.

A securing ring 42 is rigidly attached to clamp 40. A cable 44 is threaded through the ring and the end portion thereof is folded back and attached to itself by a fastener 45. A second end portion of cable 44, not shown here, is normally anchored to a relatively massive object, such as a boat or a drilling platform.

Referring now to both FIGS. 1 and 2, the operation of the underwater communication system of the present invention is believed to be as follows. To simplify the discussion, let it be assumed that transmitter/receiver 26 is in the receiving mode and transmitter/receiver 32 is in the transmission mode, although the same discussion would apply if the inverse were true.

Transmitter 32 produces an electrical, audio frequency signal on lines 34 and 36 of dipole 20, which in turn develops a fluctuating voltage between electrodes 22 and 24. The developed voltage would, in the absence of tube 38, merely produce an outwardly radiating electric field having a familiar gradiant pattern.

Since dipole 14 is immersed in the same body of water as dipole 20, it will be subtended by the electric field and in turn a weak audio frequency signal will be induced in lines 28 and 30 of dipole antenna 14. This weak signal can be detected and amplified by receiver 26.

The practical transmission range of the above-described electric field transmission system absent tube 38 is relatively small because the transmitted signal is highly attenuated by the water. The attenuation rate of seawater, for example, is approximately 55 dB per underwater wavelength. Thus at three wavelengths distance, the strength of the electric field will be attenuated about 165 dB, at which point reception becomes difficult. As a concrete example, the tubeless electric field transmission system of the above discussion probably has a maximum reception distance of about 492 feet for an average transmission frequency of 1,000 Hertz.

In accordance with the present invention, I have found that the distance at which an electric field transmission may be received is greatly increased by connecting an electrode of one of the antennas to an electrode of the other using a nonconducting unsealed plastic tube 38. This is because the tube, when flooded with water or another conducting medium, provides a conductive path of relatively small cross-section through which electric current may pass. Although I am not certain as to the exact electrical phenomenon involved, I suspect that the fluid within the tube acts like the center conductor of a coaxial cable and the surrounding water acts like the outer conductor thereof. At any rate, besides directing electric current from the transmitter's antenna to the receiver's antenna, the tube means also tends to reduce the shunt loses which normally would occur between the two electrodes of the transmitter's dipole, and thus greatly reduces transmitter power requirements.

The type of plastic used for tubing 38 should be one that has high tensile strength, yet it should be stretchable and resilient and it must have a high resistance to wear and erosion as caused by corrosives found in the body of water in which it is immersed. Because the tube is as described, it tends to endure stretching and twisting forces much better than do solid conductors. In fact, on-site tests indicate that some plastic tubes remain effective even though stretched to twice their normal length.

It has been found that the effective range of my communication system increases as the spacing between the dipole electrodes is increased. As a rule of thumb, a distance "A" between the electrodes of each dipole should be at least 1/10 the distance "B" between the two dipoles for my system to faithfully transmit and receive communication signals over the entire audio frequency range. If this rule of thumb is not followed, the higher frequency components of the communication signal may be lost due to their higher rate of underwater attenuation. If it is not possible or practical to separate the electrodes of both the dipoles by at least 1/10th the transmission distance, the distance "A" should then be made as close to one mid-audio-frequency wavelength as possible.

Referring again to FIG. 2, it should be noted that electrode 18 is recessed within the end of tube 38 by a distance "C". When the distance "C" is small, i.e., the electrode is attached proximate the top end of the tube, shunt losses occur between the two electrodes of the transmitting dipole, greatly reducing transmission efficiency of the system. However, the greater the distance "C" is made, the less the shunt losses are, and practically speaking, if the distance "C" is selected to be at least 20 feet, shunt losses will be negligible.

In FIG. 3, a block and schematic diagram of a preferred embodiment of a transmitter/receiver is shown at 200 coupled to a dipole antenna 201.

As illustrated, the transmitter/receiver includes a transmitter circuit 202, a receiver circuit 204, and a voice actuated switching circuit 206. The two electrodes of antenna 201 are respectively connected to the terminals 208 and 210.

The transmitter circuit includes a microphone 212, a power amplifier 214 and a current booster 216. In use, when a user speaks, sound vibrations 218 impinge upon a transducer within microphone 212 to produce a signal on a line 220 modulated by the user's speech.

Line 220 is coupled to power amplifier 214 by a gain limiting potentiometer 222. The potentiometer is wired in a voltage dividing configuration where one end of its resistive element is grounded, the other end of its resistive element is attached to line 220, and its wiper is connected to the input of amplifier by a line 223. By varying the position of the wiper along the resistive element, varying amounts of the voice signal on line 220 can be input to the amplifier.

The power amplifier operates in the audio frequency range and is, in this embodiment, capable of developing a signal current flow of 2.5 amperes on a line 214 without substantial distortion between the frequencies of 3.5 and 35,000 Hertz.

The power amplifier's output on line 224 is coupled to the input of current booster 216 which provides further current amplification. The current booster of the present invention can develop up to 5 amperes RMS on a signal output line 226. Output line 226 is coupled to terminal 208 and thus one of the electrodes of the dipole. Note that terminal 210, which is connected to the other electrode of the antenna, is grounded.

Receiver 204 includes a first stage attenuator 228, a preamplifier 230, a second stage attenuator 232, a high input impedance amplifier 234, a high-pass filter 236, and an output amplifier 238. A peak-to-peak detector 240 and amplifier 242 are included to form a feedback loop for automatic gain control.

Attenuator 228 is coupled to terminal 208 by a line 244 for inputing the weak audio frequency signals detected by the dipole. The attenuator is also responsive to a control voltage level which is developed upon a line 246 in a manner to be described subsequently. The first stage attenuator attenuates the signal found on line 244 proportionally to the level of the control voltage level sensed upon line 246 and develops an output signal on a line 248.

Amplifier 230 is a low noise, high gain preamplifier responsive to the signal developed on line 248 and operative to develop an amplified signal on a line 250. In this preferred embodiment, the preamplifier has a voltage level gain of about 500.

Second stage attenuator 232 inputs the amplified signal found on 250 and is also responsive to a control voltage level found on a line 252. Attenuator 232 develops an attenuated signal on a line 254, where the signal's degree of attenuation is proportional to the level of the control voltage on line 252.

Amplifier 234 is a high input impedance amplifier with a voltage gain of approximately 40 and is used to provide a second stage of amplification for the receiver circuit. The amplifier has its input connected to line 254 and develops its output on a line 256.

High pass filter 236 has its input connected to line 256 and develops an output signal on a line 258. The filter attenuates the components of the input signal that have a frequency below 400 Hertz by approximately 45 dB. This high pass filter is included in the receiver circuit to eliminate 60 and 120 Hertz hum.

A final or output amplifier 238 has its input connected to line 258 and generates an output on a line 260. The power amplifier of the present invention boosts the signal level approximately 50 times.

Output buffer 262 is coupled to line 260 by a volume control potentiometer 264. A headphone 266 is connected to the output of the buffer by a line 268. When used underwater, the headphone is preferably of the bone conduction type which is taped or otherwise secured to the head near the mastoid bone of the ear.

Peak-to-peak detector 240 is responsive to the peak amplitudes of the signal on line 260 and is operative to produce a DC potential on a line 270 proportional thereto. It is this DC potential which is coupled to the second stage attenuator by a line 252.

Operational amplifier 242 has a first input connected to line 270 and a second input connected by a line 274 to a voltage dividing potentiometer 272. The DC voltage on line 274 can achieve any value between B+ and ground as set by the potentiometer.

The operational amplifier develops a DC potential on line 246 which is proportional to the difference between the potentials on lines 270 and 274. The potential on line 246 determines the degree attenuation performed by the first stage alternator.

The peak-to-peak detector, the operational amplifier and the two attenuators are provided for the purpose of automatic gain control (A.G.C.). The level of the gain control is set by potentiometer 272.

Voice actuated switching circuit 206 is responsive to the signal produced on line 220 by microphone 212 and is operative to power either the transmitter via a line 276 or the receiver via a line 278. The transmitter and the receiver are never powered simultaneously.

Circuit 206 includes a threshold detector 210 and a SPDT relay 282 which powers the receiver in the absence of a signal on line 220. When a signal above a predetermined threshold level is developed on line 220, threshold detector 280 energizes relay 282 to cause power to be switched from the receiver circuit to the transmitter circuit. After the signal on line 220 ceases for a predetermined length of time, power is returned to the receiver.

Referring now to FIG. 4, an alternate embodiment of the present invention includes an elongated tube 300 having a pair of closing end portions 302 and 304 which completely seal the tube. Positioned at opposite ends of the tubes are electrodes 306 and 308 having insulated lead wires 310 and 312, respectively, which extend through the end portions for connection to a transmitter/receiver. The tube of this embodiment is filled with a highly conductive electrolyte solution 312 which provides a low resistance electrical path between electrodes 306 and 308. A reservoir 314, which is filled with the electrolyte solution, communicates with the interior of tube 300 by means of a connecting tube 316. Reservoir 314 is made of an expansible and contractable material such as rubber, so that if and when tube 300 stretches reservoir 314 can supply a volume of electrolyte solution sufficient to keep the tube full.

The composition of the electrolyte solution filling the tube is not critical to the performance of the system. The electrolyte can even be either strongly acidic or basic, as long as it is not so corrosive so as to attack the material of the tube or electrodes. Graphite held in colloidial suspension by a suitable liquid has also been found to be an excellent electrolyte for use in the closed tube of this embodiment.

Thus, in this alternate embodiment, the two dipoles are coupled by a highly conductive electrolyte path extending between one electrode of each dipole, and by the body of water in which the remaining electrodes are immersed to produce a highly efficient electric field path between the two dipoles.

The operational theory of this alternate embodiment is the same as the previously discussed theory of the preferred embodiment, and thus will not be reiterated. However, this alternate embodiment is superior to the preferred embodiment because of its greater transmission range due to the higher conductivity of the electrolyte solution.

In FIG. 5, a practical use for the present invention is illustrated in which my underwater communications device provides a data link between an oil well head 400 and an oil platform 402. A suitable transmitter/receiver 404 is connected to a pair of electrodes 406 and 408 forming a first dipole, and a second transmitter/receiver 410 is connected to a pair of electrodes 412 and 414 forming a second dipole. Electrodes 408 and 410 are disposed within opposite end portions of a tube means 416 which, as previously explained, acts as a wave guide for electric fields transmitted between the dipoles. In a system such as this, telemetry information can be transmitted from the wall head up to the drilling platform and inversely, commands, such as to open and close valves 418, can be transmitted down from the drill platform to the well head.

In FIG. 6, a second application for the communications system of the present invention is shown. Here a submerged data buoy 500 for measuring such parameters as underwater temperatures and current flows is connected to the upper end of a tube 502. The second end of tube 502 is anchored to the ocean floor 504 by an anchor 506.

Positioned at various points along the length of tube 504 are a number of sensor/transmitters 508 having an electrode 510 trailing in the water and another electrode 512 that penetrates and extends into tube 504.

The underwater sensors can thus transmit data to submerged data buoy 500 for retransmission via dipole 514 by wave guided electric field transmissions. A ship 516 can use a dipole antenna 516 and a receiver to detect the electric field relayed by the buoy.

Although the present invention has been described above with reference to particular preferred embodiments, it is understood that modifications thereof will be readily apparent to those skilled in the art.

For instance, the tube need not exclusively be a plastic product but may be made from other resilient materials such as woven fiberglass or rubber. Also, there are many possible constructions for the electrodes and for their attachment within a tube.

Another alternate embodiment of my invention utilizes a pair of either parallel or coaxial tubes for coupling both electrodes of a first dipole to respective electrodes of a second dipole.

Furthermore, in closed tubes such as the one described in the alternate embodiment of my invention, it is possible to utilize many fluid mediums within the tube. For instance, the fluid may be a gaseous conductor.

It is therefore intended that the appended claims be interpreted to cover all such modifications as fall within the true spirit and scope of my invention.

What is claimed is:

1. An improved underwater communications system comprising:
    first antenna means including first and second electrodes spaced apart by a first distance, and for submersion in a body of water at a first location;
    a first transmission device connected to said first antenna means for causing an electric transmission field containing communication information to radiate outwardly from said first antenna means;
    a second antenna means separated from said first antenna means by a second distance and including third and fourth electrodes spaced apart by a third distance, said second antenna means being for submersion in said body of water at a second location remote from said first location but within the range of said transmission field;
    a first reception device connected to said second antenna means for receiving the communication information contained within said electric transmission field; and
    an elongated, electrically nonconducting tube means extending from said first location to said second location, said tube means being filled with an electrically conductive fluid and having a first end portion coupled to said second electrode, and a second end portion coupled to said fourth electrode such that the conductive fluid within said tube means provides a first conductive path between said second and fourth electrode and said body of water provide a second conduction path between said first and third electrodes.

2. A communications system as recited in claim 1 wherein each said antenna means is a dipole.

3. A communications system as recited in claim 2 further comprising;
    a first hose-type clamp disposed around said first end portion of the tube means for compressively clamping the tube means tightly about said second electrode, and
    a second hose-type clamp disposed around said second end portion of the tube means for compressively clamping the tube means tightly about said fourth electrode.

4. A communications system as recited in claim 3, further comprising means for attaching an end of a first anchoring cable to said first clamp and means for attaching an end of a second anchoring cable to said second clamp.

5. A communications system as recited in claim 1 wherein said tube means is constructed, at least in part, from a stretchable resilient plastic material.

6. A communications system as recited in claim 1 further comprising;
    means for closing the ends of said tube means so that the internal volume of the tube means is sealed from the surrounding body of water, and
    an electrolyte solution filling said tube means for providing an electrically conducting path between said second and fourth electrodes.

7. A communications system as recited in claim 6 further comprising;
    a reservoir means filled with said electrolyte solution and communicating with the internal volume of said tube means so that if and when said tube means varies in length due to stretching or contracting, electrolyte solution will flow between said reservoir means and said tube means so that the tube means remains full.

8. A communications system as recited in claim 1 wherein said second and fourth electrodes are short, hollow cylinders in shape.

9. A communications system as recited in claim 8 wherein said electrodes are constructed from short pieces of stainless steel tubing.

10. A communications system as recited in claim 1 further comprising;
    a second reception device connected to said first antenna means, and
    means for selectively powering either said first transmission device or said second reception device so that when the former is powered an electric field can be transmitted from said first dipole and when the latter is powered electric field transmissions can be received by said first dipole.

11. A communications system as recited in claim 1 further comprising;
    a second transmission device connected to said second antenna means, and
    means for selectively powering either said first reception device or said second transmission device so that when the former is powered electric field transmissions can be received by said second dipole and when the latter is powered an electric field may be transmitted from said second dipole.

12. A communications system as recited in claim 1 wherein said first and third distances are substantially equivalent and wherein said second distance is at least three times greater than said first and third distances.

13. A communications system as recited in claim 1 wherein said first transmission device includes;
    a transducer means for converting the compression waves generated by speech into an electrical signal,
    gain control means responsive to said signal and operative to produce a reduced signal, and
    amplification means responsive to said reduced signal and operative to produce said electric transmission field.

14. A communications system as recited in claim 1 wherein said first reception device includes;
- a first stage attenuator responsive to said electric transmission field and to a first attenuator control voltage, and operative to produce a first attenuated signal,
- a first amplifier responsive to said first attenuated signal and operative to produce a first amplified signal,
- a second stage attenuator responsive to said first amplified signal and to a second attenuator control voltage and operative to produce a second attenuated signal,
- a second amplifier responsive to said second attenuated signal and operative to produce a second amplified signal,
- a high pass filter responsive to said second amplified signal and operative to produce a filtered signal,
- a third amplifier means responsive to said filtered signal and operative to produce a third amplified signal,
- a peak-to-peak detector responsive to said third amplified signal and operative to produce said second attenuator control voltage, whereby said second attenuator control voltage is proportional to the average peak-to-peak voltage of said third amplified signal,
- a subtracting amplifier responsive to said second attenuator control voltage and to a preset gain control voltage and operative to produce said first attenuator control voltage, whereby said first control voltage is proportional to the difference between said second attenuator control signal and said gain control voltage,
- volume control means responsive to said third amplified signal and operative to produce a reduced signal,
- a buffer means responsive to said reduced signal and operative to produce an output signal, and
- an output transducer for converting said output signal to accoustical compression waves which are audible to a user.

15. An improved method for underwater transmission comprising the steps of,
- disposing first, a second, a third and a fourth electrode in a common body of water,
- extending an elongated, nonconducting tube means that is filled with a conducting fluid between said second electrode and fourth electrode,
- connecting said first and second electrodes to an electric field transmission device,
- connecting said third and fourth electrodes to an electric field reception device,
- whereby said tube means acts as a wave guide for directing an electric transmission field between said combined first and second electrodes and said combined third and fourth electrodes.

16. A method as recited in claim 15 further comprising the steps of,
- attaching said second electrode within said tube means proximate a first end thereof, and
- attaching said fourth electrode within said tube means proximate a second end thereof.

17. A method as recited in claim 15 further comprising the step of,
- disposing and retaining a highly conductive electrolyte solution within said tube means so as to provide a low resistance electrical path between said second electrode and said fourth electrode.

* * * * *